June 18, 1935.    R. D. EVANS ET AL    2,005,136
RELAYING SYSTEM WITH DIRECTIONAL INDICATION STORAGE
Filed Dec. 22, 1933    3 Sheets-Sheet 1

INVENTORS
Robert D. Evans and
William A. Lewis
BY O. B. Buchanan
ATTORNEY

Patented June 18, 1935

2,005,136

UNITED STATES PATENT OFFICE 2,005,136

RELAYING SYSTEM WITH DIRECTIONAL INDICATION STORAGE

Robert D. Evans, Swissvale, and William A. Lewis, Wilkinsburg, Pa., assignors to Westinghouse Electric & Manufacturing Company, East Pittsburgh, Pa., a corporation of Pennsylvania Application December 22, 1933, Serial No. 703,605

32 Claims. (Cl. 175—294)

Our invention relates to protective relaying systems for responding to faults on an electric power line, and it has particular relation to means for causing the relaying system to remember or store up a record of an initial relay-function indication, for the purpose of securing proper protective relaying operations in spite of a subsequent reversal of the initial indication so stored.

There are a number of conditions of operation under which it would be desirable to store up the initial indication of a protective relay, and this desirability is encountered more frequently in the operation of the directional element, for indicating the direction of the fault power-flow, than any other element of a protective relaying system. There are a number of conditions under which the initial directional indication should be stored.

In the Goldsborough Patent No. 1,877,454, and a Curtis Patent No. 1,877,446, both patented Sept. 13, 1932, it was recognized that it might be necessary sometimes to provide means for sustaining the initial phase-relation of the voltage which was utilized as a basis of comparison with the current, in a directional relay, in order to secure an indication of the direction of current-flow. These patents were directed specifically toward the operation of high-speed relays, controlling high-speed circuit breakers.

Our present invention is directed to the problem of controlling the operation of slow-speed breakers, such as are utilized, for example, on some railway systems, as well as overcoming some additional problems which have been encountered in the operation of high-speed circuit breakers.

In the control of slow-speed circuit breakers, the problem of maintaining approximately the initial phase-position of the voltage in the directional element presents increasing difficulties according to the length of time which it takes the circuit breaker to operate, because, under certain circumstances, it is necessary to complete the interruption of one end of a faulty line-section first, and after that end is finally interrupted, to actuate the circuit breaker at the other end, thereby making it necessary to have a directional indication, at the second end, which remains accurate for a rather long period of time.

If a motor-generator set, synchronous condenser, tuned-circuit means, or other similar means is utilized for preventing a sudden change in the phase of the voltage applied to the directional element, it would be possible to increase the inertia of the sustaining means to a sufficiently high point to prevent its materially changing in phase during this period.

However, we believe that it is more economical to utilize auxiliary relays and circuits which will preserve or store up an impulse which has once been given correctly. Furthermore, it is preferable to utilize a relay system which will indicate the phase-position within a few cycles after the fault occurs, and which will store up that indication, rather than a system which gives the phase or directional indication at a later time, because the change in frequency of a transmission system during short-circuit conditions may be very great, thus vitiating the accuracy of directional indications obtained with long-sustained voltage-phases which do not respond to the change in system-frequency.

In the field of quickly clearing faults from a transmission system, particularly in protective relaying systems utilizing some sort of pilot channel between the two ends of the protected line-section, including either continuous carrier-current relaying systems, intermittent carrier-current relaying systems, or systems utilizing separate pilot wires or channels, there are times when a sudden reversal of the power-flow may occur in a sound line during the process of segregating another parallel line-section which contains a fault. In such cases, it would be possible to guard against erroneous tripping of the sound line if it were possible to store up a record of the initial directional indication which established the fact that the fault was outside of the protected line-section.

Our present invention relates to means, methods and combinations for overcoming the foregoing and other difficulties.

Figure 1:
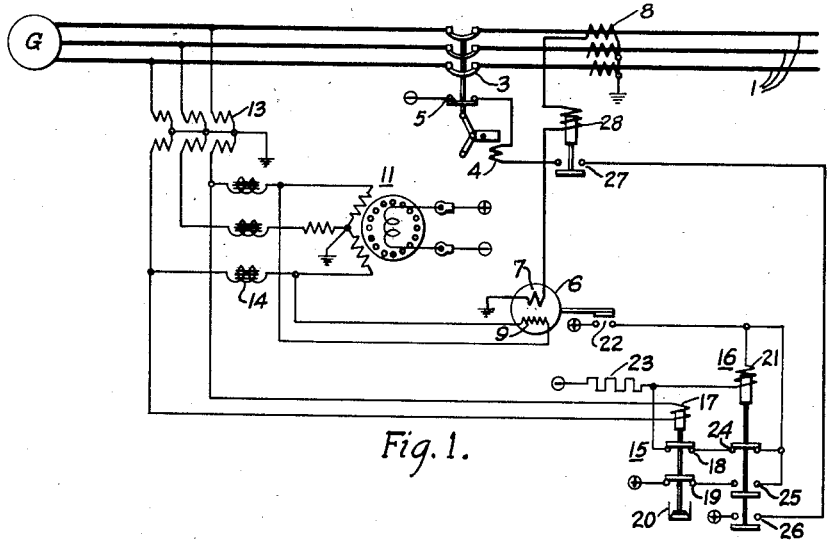
Figure 1 is a diagrammatic view of circuits and apparatus embodying our invention in a system which is particularly suitable for slow-speed circuit breaker control.

Fig. 1 shows our invention in its application to the protection of a transmission line 1 which is illustrated as a three-phase line connected to a generator G by means of a slow-speed circuit breaker 3 having a trip-coil 4 and an auxiliary switch 5 which opens when the breaker finally opens its contacts.

When a fault occurs in the transmission system it is necessary to determine whether it is accompanied by current flowing through the breaker 3 into the line 1 or current flowing back from the line 1 through the breaker to some other point in the system, and for this purpose it is common to utilize some sort of directional of wattmeter element such as that indicated at 6, comprising a current winding 7 which may be energized from a current transformer 8, and a voltage winding 9 which may be energized from a voltage-sustaining means such as a synchronous condenser 11 which is shown as being floated across the secondary terminals of a potential transformer 13, to which it is connected through inductance devices 14.

According to our invention, we utilize an under-voltage relay 15 with slight time-delay, in cooperation with an auxiliary relay 16, for preserving the indication of the directional element 6, within a few cycles after its initial operation.

The under-voltage relay 15 comprises an actuating winding 17 which is energized directly across the secondary terminals of the potential transformer 13, so as to respond rapidly to changes in the magnitude of the line-voltage, as distinguished from the directional relay winding 9 which is energized at a substantially constant value for a short time after any change in the line-voltage. The under-voltage relay 15 has two back-contacts 18 and 19 which are closed when the relay is deenergized, and retarding means, symbolized by a dashpot 20, or any equivalent means, for introducing a time-hesitation of two or three cycles, or any other desired time-delay in the drop-out movement of the relay.

The auxiliary-relay 16 has an operating coil 21 which is energized by the closing of the directional-relay contacts 22 of the directional element 6, the circuit of the operating coil 21 being completed through a resistor 23. The auxiliary relay 16 has one back-contact 24 and two front or make-contacts 25 and 26.

The front-contact 26 of the auxiliary relay 16 is utilized to perform any function such as is commonly performed directly by the directional-relay contact 22. As illustrated in the drawings, this contact 26 is utilized to complete the energization of the trip-coil 4 of the circuit breaker 3, the trip circuit of which also includes the front-contact 27 of an over-current relay 28 or any other fault-responsive device for indicating the presence of a fault condition. The tripping circuit also includes the auxiliary switch 5 of the circuit breaker 3.

The under-voltage relay 15 and the auxiliary-relay contacts 24 and 25 are utilized for the purpose of securing the storage or remembrance of the initial operation of the directional relay 6. The relay-contacts 18 and 24 are connected in series with each other and in shunt across the operating coil 21 of the auxiliary relay 16. The relay-contacts 19 and 25 are connected in series with each other and in shunt relation to the directional-relay contact 22.

The method of operation is as follows. When the line voltage is above a certain predetermined value, the under-voltage relay 17 is energized, opening its back-contacts 18 and 19, so that the directional element 6 controls the auxiliary relay 16 directly, that is, without any interference from the under-voltage relay 17; and the front-contact 26 of the auxiliary relay is utilized to perform the same function which is normally performed by the directional relay contact 22 itself.

When a fault occurs on the transmission system, however, the system-voltage is reduced in the faulted phase, and a torque is developed in the directional element 6, depending in direction upon the direction of flow of the fault-current in the transmission line 1. This direction may or may not be in the direction to close the directional-relay contacts 22, depending upon whether the fault is on the line-side of the circuit breaker 3 or on the generator-side thereof.

Whenever the voltage at the terminals of the under-voltage relay 17 falls below a predetermined value, this relay starts to drop out, and after a sufficient time-interval to allow the directional element 6 to operate, closes its back-contacts 18 and 19. The closing of these back-contacts takes the control of the auxiliary relay 16 away from the directional element 6 and maintains the auxiliary relay in whatever position it was in, at the instant when the under-voltage relay back-contacts closed. Thus, if the auxiliary relay 16 were in its deenergized position at this instant, the closure of the under-voltage back-contact 18 would complete a circuit 18—24 around the operating coil of the auxiliary relay short-circuiting the same and preventing the energization of the auxiliary relay even though the directional-relay contact 22 should subsequently close. If, on the other hand, the auxiliary relay had been in its actuated position at the instant when the under-voltage back-contact 19 closed, this contact would provide a holding circuit 19—25 for the energization of the operating coil 21 of the auxiliary relay, and keeping it energized even though the directional-relay contact 22 should subsequently open.

With our invention, as shown in Fig. 1, therefore, it is not necessary for the voltage-sustaining means 11, for providing a reference voltage for the directional element 6, to remain approximately accurate in phase-position for more than the two or three cycles or other drop-out time of the under-voltage relay 17, and the time necessary to trip out the breaker 3 may be as long as may be desired, without reference to the accuracy of the indication of the directional element 6 throughout this entire period.

Figure 2:
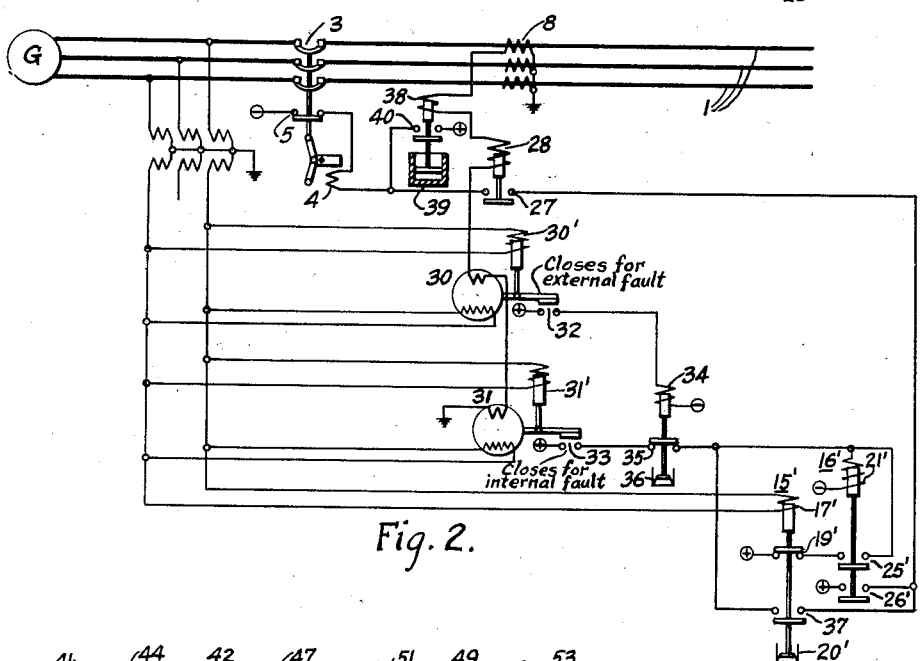
Fig. 2 is a similar view showing a modification and involving means whereby the speed of operation may be somewhat increased.

A slight modification of our invention is shown in Fig. 2. In this modified form of embodiment, the voltage-sustaining means 11 has been omitted, to illustrate the fact that our invention is not necessarily tied up with this feature. Instead of utilizing a single directional element 6 which either closes its contact 22 or fails to close said contact, the modified embodiment of our invention utilizes either a single bi-directional element or, as illustrated, two oppositely-connected uni-directional elements 30 and 31, the former being designed to close its contact 32 in the event of an external fault accompanied by current-flow from the line back through the breaker 3, and the latter being designed to close its contact 33 in the event of a fault which, so far as the directional element is concerned, is an internal fault in or beyond the line 1, that is, a fault in which the current is flowing from the breaker 3 into the line 1.

In the event of an external fault, which would result in the continuance of the deenergized condition of the auxiliary relay 16 in Fig. 1, the external directional element 30 of Fig. 2 will close its contact 32 and thus provide a positive indication of the existence of a fault with current-flow in the direction from the line 1 to the breaker 3. The closure of this external directional contact 32 is utilized to energize a delayed-action auxiliary timer relay 34 having back-contacts 35 which are connected in series with the internal directional relay contacts 33, so as to render the latter inoperative during the period when the auxiliary timer contacts 35 remain open. The auxiliary timer relay 34 is provided with a dashpot 36 or other equivalent means for retarding its drop-out motion for the period of two or three cycles or other desired period, as previously explained in connection with the delayed under-voltage relay 17 of Fig. 1, or for any other purpose.

The contact-member 35 of the auxiliary timer 34 thus makes it impossible for the internal-fault directional element 31 to energize the auxiliary relay 16' for a predetermined time, determined by the dashpot 36, after the energization and deenergization of the external-fault directional element 30; but restoring control to the internal directional contact 33 after the expiration of this predetermined time, thereby differing from the system shown in Fig. 1 wherein the directional element was permanently locked out of service, after the dropping of the under-voltage relay 17, until the line-voltage was restored. The system shown in Fig. 2 omits the relay-contacts 18 and 24 of Fig. 1, which served the purpose of locking out the directional element 6 if it had not operated before the dropping of the under-voltage relay 17.

The embodiment of our invention shown in Fig. 2 retains the under-voltage element, which is indicated by the numeral 15', the same having its operating coil 17', its back-contact 19', and its dashpot 20', corresponding to the similarly numbered elements in Fig. 1, and, in addition, having a make-contact 37, which is so connected that a circuit is provided, from the positive bus through the relay-contacts 33, 35 and 37, to perform whatever function is to be performed by the directional contacts 33, without waiting for the auxiliary relay 16' to pick up.

Thus, if, while the transmission system is operating normally, an internal fault occurs, the directional-relay contact 33 will instantly close and, the relay contacts 35 and 37 being both closed, will immediately perform whatever function is desired of the directional element, without any time-delay whatsoever, this being accomplished before the under-voltage relay has had time to drop out its front or make-contact 37.

If, however, the first indication of the fault had been an external fault-indication, the directional-relay contact 32 would close and energize the auxiliary timer 34, instantly killing the internal fault-directional relay-contact 33, so that if thereafter the direction of the fault-indication should suddenly change, due perhaps to a change in phase of the directional relay voltage, or due to any other cause, the internal fault-responsive contact 33 would instantly close, but it would not produce any action because of the opened auxiliary timer contact 35 in series therewith, which would not close for a predetermined time-interval of any desired length, as determined by the dashpot 36. Meanwhile, also, the under-voltage timer 15' would have dropped out, so that when the auxiliary timer-contact 35 finally closed, the closed internal directional contact 33 would merely complete an energizing circuit for the coil 21' of the auxiliary relay 16' causing the latter to pick up its front-contacts 25' and 26'. The front-contact 25' would complete a holding circuit 19'—25' for the operating coil 21' of the auxiliary relay 16'; and the front contact 26' would perform the desired relaying function of the internal directional element 31.

As shown in Fig. 2, the relaying function performed by the internal directional element is the same as that shown in Fig. 1, except that back-up protection is provided for, in the form of an over-current relay 38 with very long time-delay, as provided by a dashpot 39, so that its contact 40 will not close unless a predetermined high-current condition persists for a predetermined long time-interval after the occurrence of the initial fault condition. If desired, the time-delay over-current element 38 can be made responsive to larger over-currents than the instantaneous over-current relay 28.

The delayed back-up over-current element 38 makes it possible to trip out a fault that occurs in the line-section 1 after a fault has occurred in some other line-section (not shown) further on to the right of the line-section 1, or, in the event that the fault is not properly cleared in the line-section further on, it can still be cleared eventually by the opening of the breaker 3 in the line-section being protected.

The external and internal directional elements 30 and 31 shown in Fig. 2, are provided with voltage-restraint means 30' and 31', which make it easier to design the relays so that they will respond to fault-conditions without responding to load-conditions.

In both Figs. 1 and 2, the relays for only two phases are indicated. It will be readily understood that the relays for the other two phases are, or may be, substantial duplicates of the relays shown, so that no further illustration is necessary.

In relaying systems for the quick clearing of faults, associated with quick-acting circuit breakers, a situation may exist, which will be explained, in connection with Figs. 3 and 4, with particular relation to a continuous carrier-relaying system.

The expression "continuous carrier relaying" is used in contradistinction to "intermittent carrier relaying", an example of which is shown in Fig. 8 of the Scott Patent 1,765,387, patented June 24, 1930. In the continuous carrier relaying system, the carrier-current is left on the line at all times except when there is a fault in the line-section being protected, at which time the carrier-current must be removed from both ends of the line-section in order to permit instantaneous tripping. In the intermittent carrier relaying system there is normally no carrier-current superimposed on the line, but in the event of a fault accompanied by power-flow from the line to the bus at either end; carrier-current is suddenly superimposed on the line for the purpose of preventing tripping at the other end, the tripping relays being given a suitable time-hesitation or sluggishness of action, of about three cycles, in order to give the carrier-current relays time to inhibit the tripping action if the fault is not in the line-section being protected. Both relaying systems utilize, or may utilize, carrier-current transmitters of the same frequency at each end of the line-section being protected.

Figure 3:
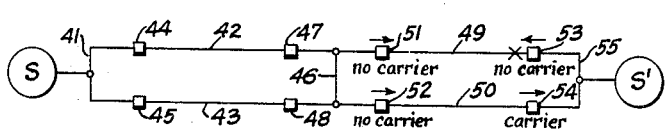
Figs. 3 and 4 are single-line diagrams of a transmission system requiring the quick clearing of faults.

Fig. 3 is a single-line diagram of a three-phase transmission system comprising a source S feeding a bus 41 which, in turn, feeds line-sections 42 and 43 through circuit breakers 44 and 45, respectively. The opposite ends of the line-sections 42 and 43 are connected to a bus 46 through circuit breakers 47 and 48, respectively, and the bus 46 is, in turn, connected to additional line-sections 49 and 50 through breakers 51 and 52. The far ends of the line-sections 49 and 50 are connected by means of breakers 53 and 54, respectively, to a bus 55 and thence ultimately to a second source S'.

Referring to Fig. 3, if a fault occurs at X near the breaker 53 in the line-section 49, the fault-power will flow in the direction shown by the arrows. It will be noted that the power-flow is from the buses 46 and 55, respectively, into the faulty line-section 49 at both ends thereof, so that carrier is removed from both ends. In the continuous carrier relaying system this removal of carrier is necessary in order to permit tripping in said system. In the sound line-section 50, however, the fault-power is flowing from the bus 46 into the line, thus removing carrier from that end of the line, but the fault-power is flowing from the line to the bus 55 at the other end, thus maintaining carrier at that end and preventing the tripping of the breakers 52 and 54 at the two ends of the sound line 50.

In the faulty line 49, the tripping circuits of the two circuit breakers 51 and 53 will be substantially simultaneously energized, so that both breakers will begin arcing at substantially the same time, but it is almost inevitable that the breaker carrying the heavier current, which would generally be the breaker 53 nearest the fault, would cease arcing one-half cycle or more ahead of the other breaker, or that one breaker would cease arcing in one of its poles before its other poles, so that there would or might be a sudden reversal of fault-current in the sound line 50.

Figure 4:
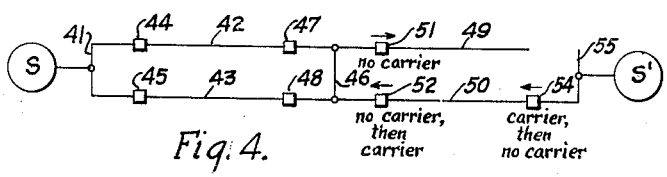

Thus, if the breaker 53 opens before the breaker 51, in the faulty line, the conditions will be as depicted in Fig. 4. It will be noted, from the arrows, that the current has reversed at both ends of the sound line 50. This means that the end having the breaker 54, which end was at first maintaining the carrier current, as indicated in Fig. 3, so as to prevent tripping, will now, if nothing is done to prevent it, stop transmitting carrier as soon as the fault-responsive directional elements reverse at this end of the sound line 50. However, at the ends containing the breaker 52, the fault-direction will also have reversed, so that this end will change from a condition of no carrier transmission to a condition of carrier transmission. If the operation of the means for controlling the carrier transmission is made as fast as possible, there is real danger that the means for removing carrier will be faster than the means for restoring carrier, resulting in a moment of time when there is no carrier on either end of the sound line 50, which, in the continuous carrier system, and possibly in other systems also, would or might result in tripping one of the circuit breakers 52 or 54 of the sound line 50, which would be very objectionable because it would be likely to cause a serious interruption in service, by opening the only line which remained for carrying the power until the faulty line 49 could be restored to operation.

Our directional indication storage means will nicely overcome the foregoing difficulties by interposing a storage indication of the registration of an external fault, thereby making it impossible to remove the carrier transmission from that end of the line-section until a predetermined time-hesitation of two or three cycles or any other predetermined time has elapsed, thus providing time for the carrier to be restored at the other end before permitting the carrier to be removed from the end at which the fault direction changes from an external direction to an internal direction.

Figure 5:
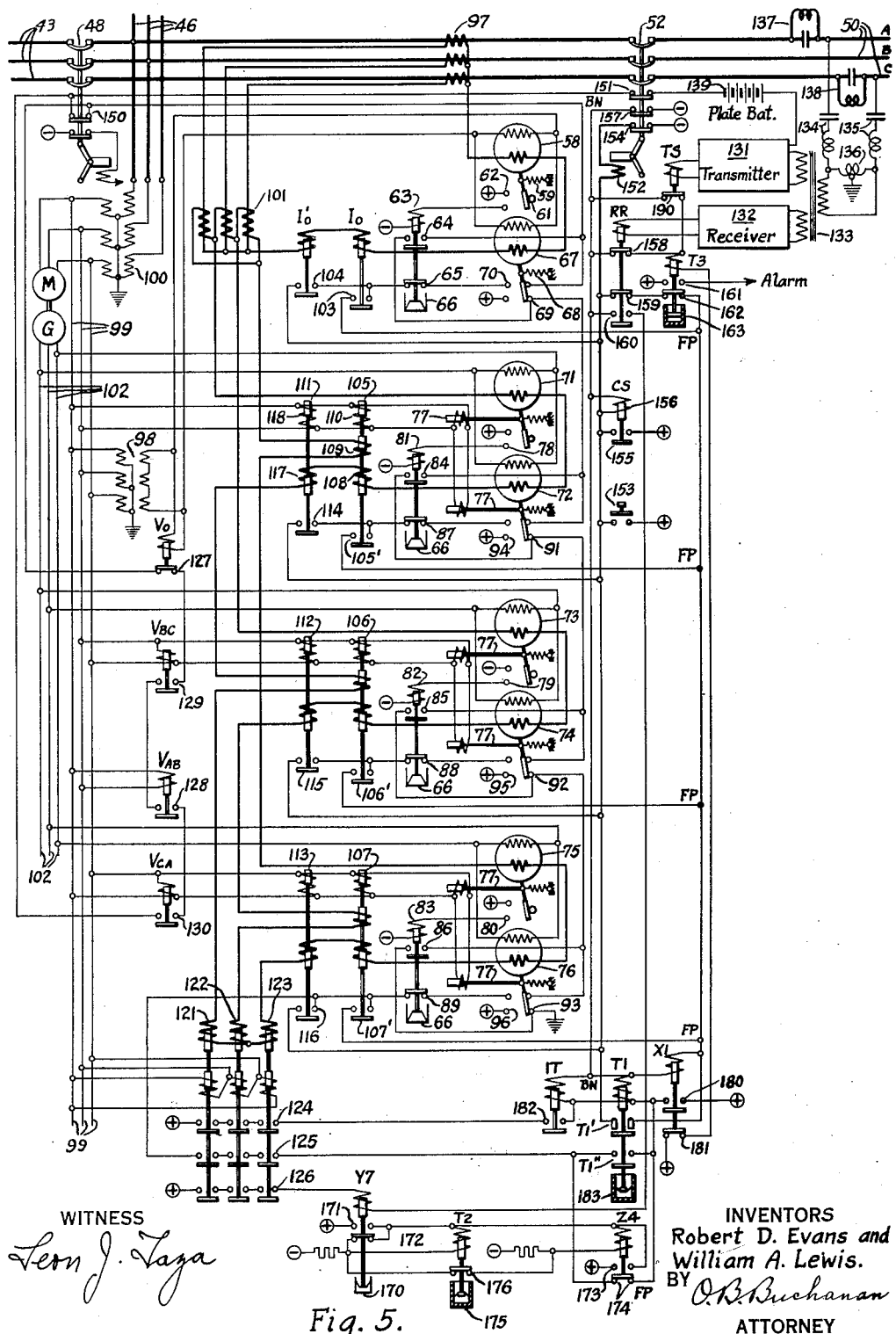
Fig. 5 is a diagrammatic view of circuits and apparatus illustrating the application of our invention to a transmission system such as that shown in Figs. 3 and 4.
Figure 6:
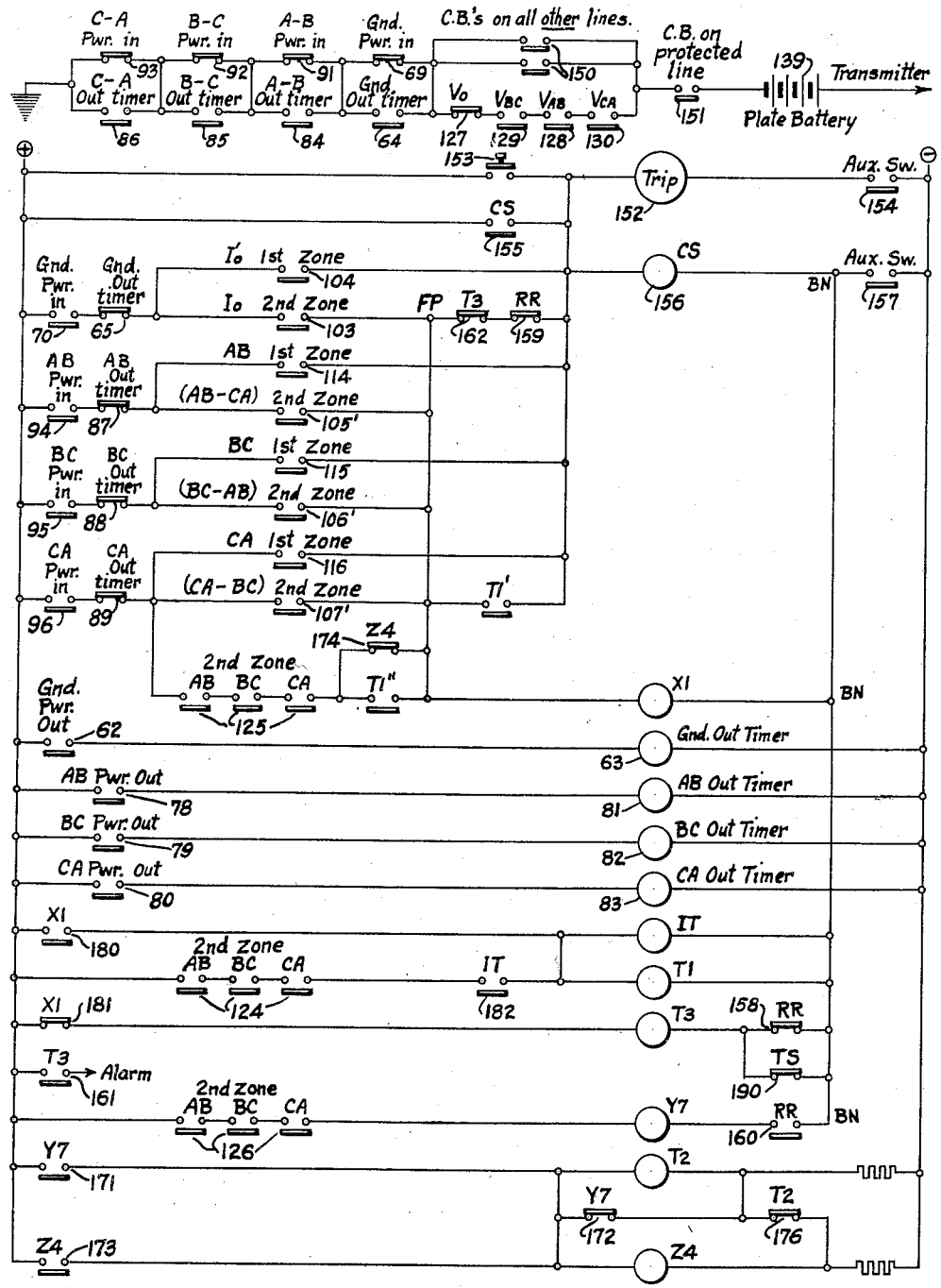
Fig. 6 is a schematic or across-the-line diagram of the relaying system shown in Fig. 5.

A continuous carrier system embodying our invention is shown by way of example in Figs. 5 and 6, which show the relaying equipment at the end of the line-section 50 having the circuit breaker 52. It will be understood that the relaying equipments at all other stations will be substantial duplicates of that which is shown in Figs. 5 and 6.

The relaying equipment shown more particularly in Fig. 5 includes an external ground directional relay 58, having a restraining spring 59 normally holding its movable element back against a back-stop 61, and having front-contacts 62, the closure of which energizes a ground "power-out" timer relay 63, having front-contacts 64, back-contacts 65, and a dashpot 66 for slightly retarding its drop-out movement. The system also includes an internal ground directional relay 67, having a restraining spring 68 which tends to hold the movable element in such position as to close its back-contact 69 and open the front-contact 70.

Three pairs of separate single-phase directional phase-to-phase elements are utilized as indicated at 71—72, 73—74, and 75—76, for responding respectively to external and internal faults in the respective delta phases AB, BC and CA of the transmission line. These elements are, or may be, similar to the ground directional elements 58 and 67, respectively, except that all six of the phase directional elements are provided with voltage-restraint means as indicated at 77 for providing a restraining torque proportional to the delta-phase to which the associated directional element is designed to respond. The contacts of the external or "power-out" phase directional elements 71, 73, and 75 are indicated by the numerals 78, 79 and 80, respectively, and their associated timers are indicated by the numerals 81, 82 and 83, respectively. Said timers have front-contacts 84, 85 and 86, back-contacts 87, 88 and 89, and dashpots 66 similar to the ground "out" timer 63.

The internal or "power-in" phase directional relays 72, 74 and 76 have back-contacts which are indicated by the numerals 91, 92 and 93, respectively, and front-contacts which are indicated by the numerals 94, 95 and 96, respectively.

The current coils of the two ground directional elements 58 and 67 are energized from the neutral circuits of three Y-connected line-current transformers 97, and the voltage coils of these two ground directional elements are energized from auxiliary residual-voltage transformers 98 which, in turn, derive their energy from a relay-voltage line or bus 99 which is supplied from potential transformers 100 connected to the bus 46.

The current coils of the phase-AB directional elements 71 and 72 are energized from a set of auxiliary delta-connected current transformers 101 which transform the line currents of the current transformers 97 into delta currents. Similarly, the current coils of the phase-BC directional elements 73 and 74, and the current coils of the phase-CA directional elements 75 and 76 receive their energy from the corresponding phases of the auxiliary delta-connected current transformers 101.

The directional voltage windings of the several phase directional elements 71 to 76 inclusive are energized from the delta voltage-phase which leads the delta current-phase in which the respective current coils are connected. Thus, the phase-AB directional elements 71 and 72 have their voltage windings energized in the delta voltage-phase-AC. In many cases, it is desirable, as shown, to provide means for sustaining the voltage which is applied to the voltage windings of the phase-directional elements 71 to 76, so as to prevent too sudden changes in either the magnitude or the phase-angle of these voltages, and such means is shown in the drawings in the form of a motor-generator set M—G which derives its energy from the relay-voltage bus 99 and supplies energy to an auxiliary voltage bus 102 which supplies exciting current to the six reference-voltage windings of the phase-directional relays 71 to 76.

The voltage-restraint means 77 of the six phase-directional relays 71 to 76 are energized from the main relay-voltage bus 99, so that when a fault occurs in one or more phases of the transmission system, the voltages applied to the corresponding voltage-restraint means 77 will suddenly drop also, in response to the line-voltages, so as to remove the voltage-restraint as quickly as possible.

The relaying system shown in Fig. 5 also includes an instantaneous ground over-current relay Io, set to respond to faults in the second zone, as will presently be described, and having a front or make-contact 103; and a second instantaneous ground over-current relay I′o, set to respond to faults in the first zone, and having front or make-contacts 104.

By the first zone, we mean the relaying zone which extends from the relaying point out to about 80% or 90% of the length of the line-section being protected, and by the second zone we mean faults lying in or beyond the first zone and up to some point usually chosen to be near the middle of the next section beyond the one being protected.

The Fig. 5 system also includes a set of three unbalanced-current relaying elements 105, 106 and 107, having make-contacts 105′, 106′ and 107′, respectively. These relaying elements respond to unbalanced phase-faults, that is, faults involving two of the line-conductors A, B and C, but not involving all three. Each of these unbalanced-current relays has an actuating current-winding 108 and a restraining current-winding 109, said current-windings developing independent torques responsive respectively to the squares of the currents energizing the same. Preferably, although not necessarily, these unbalanced-current relays 105, 106 and 107 are also provided with voltage-restraint elements 110 which develop an independent torque responsive to the square of the voltage applied to the same. This voltage-restraint makes the unbalanced-current elements 105, 106 and 107 respond, for unbalanced faults involving two of the line conductors but not all three, substantially like impedance relays having their balance-points set to fall at the end of the second relaying zone previously referred to.

Thus, considering the unbalanced-current relay element 105, it will be noted that the actuating winding 108 is energized in accordance with the phase-AB current; the restraining current-winding 109 is energized in accordance with the phase-CA current, and the restraining voltage-winding 110 is energized in accordance with the phase-AB voltage. In case of a fault on the delta-phase AB, the actuating winding 108 will carry the fault-current plus the load-current, and the restraining current-winding 109 will carry only the load-current, which is substantially the same as the load-current component in the actuating winding 108. As the torques due to these two current-windings oppose each other, what little torque there is, in the restraining winding 109, due to the relatively small load-current, will approximately balance that part of the actuating torque 108 which is due to the load-current component, so that the resultant torque of the two current-windings 108 and 109 will be an actuating torque responsive practically solely to the fault-current in phase-AB. This torque is opposed by the restraining torque produced in the voltage-element 110 which responds to the phase-AB voltage, which makes the relay 105 a phase-AB impedance relay.

It will be noted that the phase-AB current applied to the actuating winding 108 is in fact equal to the phase-A line-current $I_A$ minus the phase-B line current $I_B$, so that the coil 108 responds to $I_A - I_B$, subtracted vectorially. Similarly the current restraining-element 109 responds to $I_C - I_A$, subtracted vectorially, and the voltage restraining-element 110 responds to $V_A - V_B$, subtracted vectorially.

In the event of a delta fault involving line conductors B and C, it will be noted that the line-currents $I_B$ and $I_C$ will both be of fault-magnitude, and these currents will substantially counteract the effects of each other in the two current-windings 108 and 109, so that the relay 105 will not respond at all to phase-BC faults.

A phase-CA fault will powerfully energize the current restraining-winding 109 and prevent the operation of the relay 105.

A three-phase fault will involve equal currents in the two current windings 108 and 109, so that the operation of the relay 105 will be prevented by the voltage restraint-element 110.

A ground-fault involving only the line-conductor A will develop equal fault-current components in the $(I_C - I_A)$ coil 109 and in the $(I_A - I_B)$ coil 108, so that the pulls of these two coils will be substantially balanced and the operation of the relay 105 will be prevented by the voltage restraint-element 110.

A phase-C ground fault will produce a fault-current component in the current restraining-element 109 without producing any fault-current component in the actuating element 108 of the relay 105, so that the relay will not be actuated.

The only possible remaining kind of fault is a single line-to-ground fault in phase-B. If there is any material amount of load, the delta load-current $(I_C - I_A)$ will be so much larger than the difference between the load-current $I_A$ and the ground-current $I_B$ that the operation of the relay 105 will be prevented by the current-restraint winding 109 which is responsive to the vectorial difference, $(I_C - I_A)$, aided, of course, by the voltage restraint-element 110 which is responsive to the vectorial difference of $V_A - V_B$. At no load, the torque of the current restraint-element 109 will be zero, but the voltage restraint-element 110 will alone suffice to prevent operation of the relay 105, for any fault short of possibly a dead-ground at the bus, because the voltage-restraint, instead of being proportional to $V^2_B$, as it should be, in a ground-fault impedance element, will be proportional to the square of the vectorial difference, $(V_A - V_B)$, which is always larger than $V^2_A$ and hence much larger than the reduced value of $V^2_B$ which prevails at the time of a ground-B fault.

It will thus be seen that the differential-current relay 105, energized with delta currents, and with delta voltage-restraint, will respond only to unbalanced phase-AB faults and will not respond to any other possible fault condition. Similarly, the relays 106 and 107 respond solely to unbalanced phase-BC faults and unbalanced phase-CA faults, respectively.

The Fig. 5 system also includes a set of three-first-zone delta-phase impedance elements 111, 112 and 113, each having a make-contact 114, 115 and 116, respectively. It will be understood that these elements are typical of any elements which respond to faults in the respective phases AB, BC and CA, in the first relaying zone, and they may be either simple over-current relays, if such relays are sufficiently discriminatory, in which case the voltage-restraint windings would be omitted, or they may be, as shown, impedance elements consisting of current-responsive actuating windings 117 and voltage-responsive restraining windings 118.

The Fig. 5 system also includes three second-zone delta-phase impedance elements 121, 122 and 123, which are similar to the relays 111, 112 and 113 except that they respond to faults out as far as the end of the second relaying zone. These relays also may or may not have the voltage-restraint elements which are shown. The over-current or impedance relays 121, 122 and 123 each have three make-contacts 124, 125 and 126.

The Fig. 5 system also includes an instantaneous residual voltage relay V₀ having a back-contact 127 and three instantaneous delta-phase voltage relays $V_{AB}$, $V_{BC}$ and $V_{CA}$, each having one front contact as indicated at 128, 129 and 130, respectively.

The Fig. 5 system is a continuous carrier relaying system involving a carrier-current transmitter which is indicated schematically by a rectangle 131 as the details of it are not necessary to an understanding of the present invention. It may be a transmitter similar to that which is shown in our copending application Serial No. 660,342, filed March 11, 1933, for Protective relay systems. The system likewise includes a carrier-current receiver which is schematically indicated by a rectangle 132 and which may be similar to that which is shown in detail in our copending application just mentioned, or it may be any other suitable receiver system the details of which are not essential to an understanding of the present invention. The transmitter 131 and the receiver 132 are shown as being coupled to line-conductors A and C of the line 50 by means of a coupling transformer 133 and tuned circuits 134 and 135, respectively, which may be protected by a grounded drain-coil 136. Carrier-currents are confined to the line 50 by means of suitable traps 137 and 138.

The transmitter 131 is conveniently controlled by means of its plate circuit which contains the plate battery 139. This form of control is chosen because it is, in general, quicker to open a circuit, such as the plate circuit of the transmitter, than it is to close a circuit, such as the grid circuit (not shown) of the transmitter, and hence we usually prefer to effect our carrier-transmitter interruption by means of break-contacts rather than by means of make-contacts. It will be readily understood, of course, that our invention is not limited to this particular means of controlling the carrier transmitter 131.

The Fig. 5 system also includes certain auxiliary equipment which will be referred to in the course of the explanation of the operation.

The operation is best followed from the schematic or cross-the-line diagram shown in Fig. 6.

If there is a fault involving either ground-current or phase-currents of fault-magnitude and if the fault-power is flowing into the line 50 from the bus 46, one or more of the internal or "power-in" directional elements 67, 72, 74 or 76 will operate. As soon as the actuated directional element moves, its back-contact 69, 91, 92 or 93, as the case may be, will be instantly broken. These back-contacts are all in series in the transmitter plate circuit which will thus be instantly interrupted.

It will be noted that the four "power-in" contacts 69, 91, 92 and 93 are severally shunted by the corresponding "power-out" timer contacts, 64, 84, 85 and 86, so that, if the "power-in" indication follows immediately after a "power-out" indication, the transmitter plate-circuit cannot be interrupted until after a suitable time-delay, as determined by the dashpots 66 or equivalent retarding devices. Thus, in accordance with our invention, the "power-out" directional indication is stored up and utilized to prevent too hasty relay operation as a result of a sudden reversal of fault-power. At the same time, it will be noted that the power-out timers 63, 81, 82 and 83, having the plate-circuit contacts 64, 84, 85 and 86, respectively, will not interpose any time-delay in the normal relaying operations in which a "power-in" fault-direction will be obtained at the outset, before any fault-out direction has been indicated.

In order to obtain an indication of the direction of the fault current, it is necessary to have a certain minimum fault current. It sometimes happens that there is an adequate source of supply at only one end of the line-section being protected, so that current of fault-magnitude will not be obtained at the other end of the faulty line-section, at least until the first-mentioned end has been disconnected from the source of supply.

A source for supplying ground-currents, in case of ground-faults, is obtained by means of a suitable grounded neutral-connection at or beyond the bus associated with the relaying equipment. It will be noted that the grounded neutral of the small potential-transformer 100 will give at least some small amount of ground-current, appearing to flow from the bus 46 into any ground-fault on the protected line-section 50. If the bus 46 is connected to other similar grounded buses back of it in the transmission system, it is contemplated that sufficient ground-current would flow from the bus 46 to the line-section 50, in the event of a ground fault in said line-section, to actuate the extremely sensitive ground directional relays 58 and 67.

A source for supplying either unbalanced phase-to-phase fault-currents or three-phase fault-currents would include all of the rotating polyphase machines which are connected to the bus 46 or to points back of the bus 46, as such rotating machines will operate momentarily as induction or synchronous generators or as phase-balancers. It is assumed that if there is any other bus in addition to the bus 46, associated with the transmission system back of the protected line-section 50, there will be sufficient phase-to-phase fault-current to actuate the phase-directional elements 71 to 76.

In case the bus 46 is disconnected from all other lines so that nothing is connected to it except the protected line-section 50, it would then be safe to assume that the fault is in the line-section 50 if there should be a voltage-indication of fault. Hence, we have shown a series of four voltage-relays $V_O$, $V_{BC}$, $V_{AB}$ and $V_{CA}$ having their contacts 127, 129, 128 and 130 connected in series with each other and in series in the plate-circuit of the transmitter 131, said voltage contacts being shunted by auxiliary switches 150, associated with all of the other circuit breakers which are connected to the bus 46, other than the circuit breaker 52 which supplies the protected line-section 50. In Fig. 5, only one such other circuit breaker is shown, by way of illustration, the same being the circuit breaker 48 which has an auxiliary switch 150 which is closed when the circuit breaker is closed and open when the circuit breaker is open. If there are more than one circuit breaker similar to 48, in addition to the circuit breaker 52, on the bus 46, the auxiliary switches 150 of all of them will be connected in parallel, as indicated in Fig. 6.

When the circuit breaker 52 of the protected line-section is itself disconnected from the bus 46, the carrier-current transmitter 131 should be disconnected from that end of the protected line-section, without waiting for a voltage-indication of a fault, leaving the control entirely under the supervision of the protective equipment at the other end of the line-section. This function is accomplished by an auxiliary switch 151 on the circuit breaker 52, said auxiliary switch being connected in series in the transmitter plate-circuit, so that when the circuit breaker 52 is opened the carrier-current transmission will be interrupted.

The trip-coil 152 of the circuit-breaker 52 is energized either by means of a manually controlled push-button 153, or by means of the automatic protective relaying equipment, the operation of which can best be traced by reference to Fig. 6.

In the case of a ground-fault somewhere on the transmission system, so located that it is accompanied by fault-power flowing from the bus 46 into the protected line-section 60, the "power-in" ground directional relay 67 will be actuated and close its front contact 70, which will start a circuit from the positive bus through the contact 70 to the closed contact 65 of the ground-out timer 63.

If the fault is in the first relaying zone that is, up to about 80% or 90% of the length of the protected line-section, the first-zone ground over-current relay I'o will be actuated and close its contact 104, thereby completing a tripping circuit directly to the trip coil 152, from which the circuit is completed through an auxiliary switch 154 on the circuit breaker 52, and thence to the negative bus. As soon as the circuit breaker opens, the auxiliary switch 154 interrupts the tripping circuit.

A contactor CS is usually provided, having a contact 155 which by-passes all of the light relay-contacts, such as 70, 65, 104, and carries the heavy tripping current until the same is finally interrupted by the auxiliary switch 154, thereby preventing damage to the light relay-contacts. The operating coil 156 of the CS contactor is so connected that it is energized whenever the trip-circuit is energized, being either in series with the trip-coil 152 or in shunt therewith, the latter connection being shown in the drawings. The circuit to the CS contactor-coil 156 is completed through another auxiliary switch 157 carried by the circuit breaker 52, said switch being closed when the circuit breaker is closed and open when the circuit breaker is open. This auxiliary switch 157 is connected between the negative bus and an auxiliary breaker-position-responsive negative bus BN, to which some of the other relaying equipment is also connected.

Going back to the assumption of a ground-fault with "power-in" direction, if the fault is beyond the first zone and within the second zone, that is, up to say 50% beyond the length of the protected line-section 50, the first-zone ground over-current relay I'o will not be actuated, but the second-zone ground over-current relay Io will be actuated, closing its contact 103 and completing a circuit from the positive bus, through the contacts 70, 65 and 103, to an auxiliary fault-responsive positive bus FP. At the same time, the "power-in" ground directional relay 67 will open its back-contact 69, thereby interrupting the transmitter plate-circuit and stopping the transmission of carrier at that end of the protected line-section 50.

If, then, the fault is outside of the protected line-section 50, the fault-current at the other end will be flowing from the line to the bus beyond, so that the "power-in" ground directional relay at that other end will not be actuated and carrier-current will not be removed from said other end of the protected line-section 50.

Associated with the carrier-current receiver 132 is a receiver relay RR having two back-contacts 158 and 159, and one front-contact 160.

The equipment also includes a carrier-failure timer T3 having a front contact 161 and a back-contact 162, said timer being very sluggish in its operation as indicated by a heavy dashpot 163, as shown in Fig. 5.

In the case previously assumed, with a ground-fault beyond the protected line-section 50, the carrier-current will remain on the far end of the line-section and will maintain the energization of the receiver relays RR at both ends of the protected line-section.

Reference to Fig. 6 will show that the tripping-circuit from the auxiliary fault-responsive positive bus FP is completed through the T3-timer back contact 162 and the receiver-relay back-contact 159 to the trip-coil circuit. As long as the receiver relay RR is energized, its back-contact 159 is open and prevents the completion of the tripping circuit from the fault-responsive positive bus FP.

In case of a fault involving ground-current flowing from the protected line 50 into the bus 46, the ground-out relay 58 will be actuated, closing its contact 62 and energizing the actuating coil 63 of the ground-out timer, thereby closing the front-contact 64 and opening the back-contact 65 of the latter. The closed front-contact 64 makes it impossible for the ground-in directional element 67 to thereafter open the transmitter plate-circuit for a predetermined time after the deenergization of the ground-out timer, as determined by the dashpot 66 shown in Fig. 5. The open back-contact 65 makes it impossible for the ground-in relay 67 to complete a tripping circuit, through its front-contact 70, for the same predetermined time after the deenergization of the ground-out timer.

In case of an unbalanced fault involving two of the phase conductors A, B and C of the protected line 50, for example, the phases A and B, if sufficient ground-current is also flowing, the ground protective equipment will operate as previously described. If the ground-current is insufficient, the protection will devolve solely upon the phase protective equipment. In either event the latter will operate.

If the phase-AB fault is so located that it is accompanied by fault-power flowing from the bus 46 into the protected line 50, the AB "power-in" relay 72 will be actuated, opening its back-contact 91 and closing its front-contact 94. The open back-contact 91 will stop the carrier-current transmission at that end of the protected line-section 50, and the closed front-contact 94 will start a tripping circuit from the positive bus, including the contact 94 and the back-contact 87 of the AB out-timer 81.

If the phase-AB fault is in the first zone, the phase-AB first-zone impedance relay 111 will operate and close its contact 114, thereby completing a tripping circuit 94, 87, 114, immediately to the tripping circuit of the trip-coil 152.

If the phase-AB fault is an unbalanced fault beyond the first-zone but within the second zone, the unbalanced-current element 105 will operate, closing its contact 105' and completing a circuit 94, 87, 105' to the auxiliary fault-responsive positive bus FP, from which a tripping circuit is completed or not, according as the receiver-relay contact 159 is closed or open, as previously described in connection with ground faults. An unbalanced phase-to-phase fault in either of the other phases BC or CA will operate similarly, through the relaying equipment connected in these phases, as will be obvious from Figs. 5 and 6.

In case of a three-phase fault, the phase-directional elements in all three phases will operate simultaneously, indicating either "power-in" or "power-out" direction. Likewise, the first-zone phase-to-phase impedance elements 111, 112 and 113 will all operate simultaneously in response to a three-phase fault in the first zone. If the three-phase fault is beyond the first zone but within the second zone, the second-zone impedance elements 121, 122 and 123 will all operate, closing their front contacts 124, 125 and 126. Before tracing out the circuit controlled by these impedance-element contacts, it will be necessary to allude to certain auxiliary equipment.

The relaying system shown in Figs. 5 and 6 includes means for securing proper relaying, even during out-of-synchronism conditions which have, in times past, presented an unsurmountable difficulty, in any kind of pilot relaying, whether utilizing continuous carrier, intermittent carrier, or pilot wires, because at one or more points in the transmission system, which are called electrical centers, it may appear that power is flowing into these points just as if there were a three-phase fault at each of these points, so that any relaying system responsive to three-phase faults would respond to such out-of-synchronism conditions so as to trip out the line-sections containing these electrical centers of the distribution system. In the relaying system shown in the drawings, means have been provided for affording out-of-step protection, and preventing faulty relaying operations under these conditions. Said means, and the method of operation involved thereby, constitutes the subject matter of an application of William A. Lewis, Serial No. 703,606, filed December 22, 1933, for Out-of-step protection. In order to make the description of the entire relaying system complete in this application, the following description of the out-of-step protection is included.

During the early stages of out-of-step operation, the two ends of each line-section begin gradually to swing apart in phase, increasing the phase-angle between the two ends until exact phase-opposition is reached at 180°, and then on through to 360°, and then repeating the cycle, requiring a time which may be of the order of a second or several seconds to complete a cycle, dependent upon the system-constants and the operating conditions of the system.

Out-of-synchronism conditions are recognized by the fact that, during the early stages, power flows through each line-section from one end to the other in a manner similar to an external fault, the current increasing from load-magnitude to fault-magnitude as loss-of-synchronism is approached. As the power-sources feeding the two ends of the line section reach approximate phase-opposition, there will be no change in power-flow in those sections which do not contain an electrical center.

But where an electrical center of the system falls in any particular line-section, there will be a brief period in the out-of-synchronism cycle of the transmission system, lasting from just before until just after the 180° phase-position is reached, when the losses of the line are being supplied at both ends of the line-section, so that power of fault-magnitude flows into such a line-section from both ends, thus momentarily simulating an internal three-phase fault. This is a condition of unstable equilibrium and will not be maintained, returning again to a through-power condition, with power flowing in at one end and out at the other end of the line-section, soon after the condition of exact phase-opposition is past, so that, if the tripping-sequence of the three-phase fault-responsive devices is momentarily opened, by a time-delay relay energized before the condition of phase-opposition is reached, tripping will be prevented.

In the illustrated relaying system, as the two sources pull out of synchronism, power flows through the relayed section 50, at the same time that current of fault-magnitude is approached. This will be a balanced three-phase through-current, that is, a current flowing all the way through the protected line-section, entering at one end and leaving at the other. At the end where the current enters, carrier is removed, by the actuation of the "power-in" directional elements 72, 74 and 76, which open their back-contacts 91, 92 and 93. At the end where current leaves, however, the carrier is maintained. This condition is recognized by the continuance of a balanced three-phase over-current for a time long enough for the fault to have been cleared, wherever it was, if the over-current had been caused by a fault anywhere on the system.

In the system shown in Figs. 5 and 6, the equipment for indicating this out-of-step condition comprises a Y7 auxiliary relay, the operating coil of which is energized by the closure of the contacts 126 of the three-phase over-current or impedance elements 121, 122 and 123, the circuit to the Y7 coil being completed through the front-contact 160 of the receiver relay RR, so that the Y7 relay is not energized unless the receiver relay RR is also energized. The Y7 relay is provided with a slight time-hesitation of two or four cycles, as indicated by the light dashpot 170, so that it will not pick up instantly, allowing time for the receiver relay RR to become deenergized by the removal of carrier from both ends of the protected line-section, in case the over-current condition should have been caused by a fault in the line-section. The Y7 relay is provided with front-contacts 171 and back contacts 172.

As soon as the out-of-step relay Y7 picks up, it closes its contact 171 and thus completes a circuit from the positive bus to the tripping coils of an out-of-step time lock-out relay T2 and an auxiliary out-of-step relay Z4. The relay Z4 is instantaneous in its action and is provided with front- and back-contacts 173 and 174, respectively. The energization of the relay Z4 immediately closes a holding circuit through the Z4 front-contact 173, by-passing the Y7 relay-contact 171.

Referring back to the tripping circuit for responding to three-phase faults beyond the first zone but within the second zone, it will be noted, from Fig. 6, that the tripping circuit for such faults includes the front-contact 96 of the CA "power-in" directional element 76, the back-contacts 89 of the CA out-timer 83, the three serially connected contacts 125 of the three phase-over-current or impedance elements 121, 122 and 123, and the back-contact 174 of the auxiliary out-of-step relay Z4, thence to the auxiliary fault-responsive positive bus FP, from which the tripping circuit is completed as previously described.

It will be noted that the out-of-step relay Z4 has its back-contact 174 in series with only the three-phase fault-protective equipment of the carrier-current relaying system, so that it does not affect the operation in response to any other kind of fault, that is, in response to any fault involving ground current or any unbalanced phase-fault.

If a balanced three-phase fault-current continues, however, for a certain length of time, which must be longer than it would take to close the trip contact 155 of the contactor CS in case of a three-phase fault, which is or may be of the order of two cycles, the out-of-step relay Z4 will pick up and open its back-contact 174 which is in series with the three-phase tripping circuit as previously outlined, thereby preventing the faulty tripping of a sound line which frequently occurred, in previous systems, during the out-of-step cycle, as already mentioned.

The out-of-step timing relay T2 is of the instantaneous pick-up type, with time-delay reset, as indicated by the dashpot 175. Its actuating coil is by-passed by the Y7 relay-contact 172 which closes when the Y7 relay is deenergized. The T2 relay has a back-contact 176 which closes after a predetermined time-delay upon the deenergization of the relay T2, and the circuits are such that when the back-contacts 172 and 176 of Y7 and T2 are closed, the actuating coil of the Z4 relay will be short-circuited, thus deenergizing the latter, reclosing the Z4 back-contact 174 in the tripping circuit, and opening the Z4 holding-circuit at 173.

If there is not an electrical center in the line-section 50 being protected, the receiver-relay front-contact 160 will remain closed throughout the out-of-synchronism condition, and the over-current relay contacts 126 will remain closed until near the end of the out-of-synchronism cycle, when the two sources of the two ends of the line will again approach in-phase position. As the two sources vary in speed, they will change successively from in-phase position to out-of-phase position, resulting respectively in the alternate deenergization and energization of the Y7 relay, following the slip frequency. There is no need for out-of-step protection under these circumstances, because we have assumed a line-section in which there is no electrical center and hence in which there is never a condition of the simultaneous flowing of power of fault-magnitude into both ends of the line-section.

If an electrical center of the transmission system should fall within the line-section 50 being protected, there will be a brief time, near the condition of exact phase-opposition of the two sources, when power of fault-magnitude will flow into both ends of the line-section, thus operating the "power-in" phase-directional relays 72, 74 and 76 and interrupting the carrier-current transmission at both ends of the protected line-section, so that the receiver-relays RR at the two ends are deenergized. The deenergization of the receiver relay RR opens its contact 160 and deenergizes the Y7 relay, thus short-circuiting the energizing coil of the T2 relay by the closure of the Y7 relay back-contact 172.

The T2 relay then starts to drop-out, and its drop-out time (plus the Y7-relay drop-out time) must be of the order of 10 or 15 cycles to a second, or long enough to permit riding over that portion of the out-of-step cycle in which the relaying conditions are similar to an internal three-phase fault within the protected line-section 50, or until the power-direction is no longer into the protected line-section at both ends thereof, that is, until the power is again flowing into one end and out of the other end, thus restoring carrier-current transmission to the end of the line at which the power is flowing out, picking-up the receiver-relays RR at both ends of the line.

At this time, the Y7 relay is again energized, thus removing its short-circuit 172 from the operating coil of the T2 timing relay and permitting the latter relay to move its back-contact 176 wide open before it had had time to become closed. The T2 timing relay will thus be kept in its energized position, and its back-contact 176 will not close during the out-of-synchronism condition. As long as the T2-relay back-contact 76 does not close, the Z4 relay will remain energized and will, in turn, prevent tripping by reason of its open back-contact 174 in the tripping circuit of the three-phase fault-responsive device.

If either a ground-fault or an unbalanced phase-fault should occur during out-of-synchronism conditions, the fault will be cleared instantly, just as if the out-of-synchronism condition did not exist, because the Z4 back-contact 174 does not interfere with such tripping, as previously mentioned. If, however, a three-phase fault should occur during out-of-synchronism conditions, it cannot be cleared until the T2 timer closes its back-contact 176, thereby short-circuiting the operating coil of the Z4 relay and closing the back-contact 174 of the latter. This would involve the time-delay which is inherent in the drop-out time of the T2 timing relay.

It will now be appreciated why the Y1 relay should have a somewhat slow pick-up of at least two or three cycles, or why the overall pick-up time of the Z4 relay, from the beginning of the energization of the Y7 coil, must be of the order of two or three cycles, or longer than it takes to close the trip-contacts 155 of the contactor CS in case of a three-phase fault, which is of the order of two cycles. This is so, because as soon as the Z4 relay picks up, its back-contact 174 opens and prevents tripping as a result of a three-phase fault.

The relaying system shown in Figs. 5 and 6 also provides for back-up protection. For this purpose, there is provided an auxiliary relay X1, the operating coil of which is connected between the fault-responsive positive bus FP and the breaker-position-responsive negative bus BN, so that it is energized whenever there is a fault with fault-power flowing from the bus 46 into the protected line-section 50. The X1 relay is energized, therefore, whether the fault is in the protected line-section 50 or outside of the protected line-section 50 but within the second tripping zone.

The auxiliary fault-responsive relay X1 is provided with a front-contact 180 and a back-contact 181. Its front-contact 180 is closed whenever the X1 relay is energized, and it completes an energizing circuit from the positive bus to the operating coils of both a back-up timer T1 and an instantaneous auxiliary relay IT which is associated with it. The instantaneous relay IT has a front-contact 182 which completes a holding circuit for the relay IT and the timer T1, provided that it is a three-phase fault which actuated the X1 relay, as indicated by the energization of the three phase-overcurrent or impedance elements 121, 122 and 123, closing the contacts 124 of the latter. This holding circuit 124—182 is necessary in order to maintain the energization of the T1 timer even after the interruption of the energization of the fault-responsive relay X1, because such an interruption of X1 may be brought about by the actuation of the Z4 relay, opening its back-contact 174 in the out-of-step protective system. Thus, if there were a three-phase fault in the second line-section, that is, in the line-section to the right-hand end of the line-section 50, the holding-circuit 124—182 insures that the operation of the back-up protective features on the line 50 will not be cut off by the Z4 out-of-synchronism relay-contact 174.

The back-up timer T1 is provided with two front-contacts T1' and T1", and is extremely sluggish in its pick-up action, as indicated by a heavy dashpot 183.

The back-up timer T1 is set to have a time of operation long enough to permit normal tripping in the second section, for example, if the fault is in the second section, whether the fault is a ground-fault, an unbalanced fault, or a three-phase fault. This time will include both the relay time and the necessary circuit-breaker time, it being understood that quick-acting circuit breakers, possibly as quick as three cycles or even less, will be utilized. If the fault is not cleared in a predetermined time which is longer than that necessary for it to be cleared if the relaying equipment is operating properly, the back-up timer T1 will close its first contact T1' which by-passes the circuit containing the receiver-relay back-contact 159 and the carrier-failure-timer back-contact 162, so that tripping will be effected even though carrier-current is not removed from the line, that is, even though the receiver relay RR remains energized, with its back-contact 159 open.

At the close of the pick-up movement of the back-up timer T1, it closes its second contact T1", which by-passes the Z4 contact 174 of the out-of-step protection, and makes it possible to clear a three-phase fault through the back-up tripping contacts T1" and T1'. The time-delay in the closure of the T1" contact may be very great, of the order of several seconds or even minutes, in order to insure that the circuit breaker 52 is not tripped during the continuance of any possible or probable out-of-synchronism condition. No such great time-delay is necessary, however, in the back-up protection for faults involving grounds or unbalanced currents, and hence the first back-up timer contact T1' may close in a much shorter time, merely long enough to permit the fault to be cleared by some other circuit breaker, if it is going to be cleared at all, before the operation of the back-up timer contact T1' makes it possible to clear the fault by means of the circuit breaker 52 which is being controlled.

An important advantage of the continuous carrier system over the intermittent carrier system is that the continuous carrier system may readily embody means for quickly indicating any fault in the carrier-current apparatus, whether transmitter or receiver, as soon as it occurs, whereas, in an intermittent carrier system, such a fault may not become evident until an occasion arises for putting the carrier onto the line in order to prevent tripping, in which case its failure will result in a faulty tripping operation, which is the first notice which the station-operator has of the carrier-current failure. The carrier-failure indication shown in the drawings is similar to that which is shown and covered in the previously mentioned Lewis and Evans application Serial No. 660,342.

Referring to Figs. 5 and 6, it will be noted that a transmitter-supervisory relay TS is shown, which is energized whenever the transmitter is operating. It is provided with a back-contact 190 which is closed when the transmitter-supervisory relay is deenergized.

Referring to Fig. 6, it will be noted that the carrier-failure timing relay T3 is energized whenever there is no "power-in" fault, as indicated by a closed condition of the back-contact 181 of the X1 relay, and whenever, at the same time, there is either a failure of carrier-reception or a failure of the transmitter 131, as indicated by the dropping of the contacts 158 and 190, respectively. After a suitable time-delay, which is longer than the longest tripping-time of the back-up protection, the carrier-failure timer T3 will complete its pick-up movement and will close its front-contact 161, thus sounding an alarm. At the same time, the carrier-failure timer T3 will open its back-contact 162, thus permanently locking out the receiver-relay tripping-contact 159, and thereafter permitting tripping only as a result of the back-up protection afforded by the T1' contact, until the station-attendant, aroused by the alarm, has had time to discover and correct the cause of the carrier-failure.

While we have shown our invention in several illustrative forms of embodiment, it will be understood that various modifications and alterations may be resorted to, as will be more or less obvious to those skilled in the art, without departing from the general basic principles of our invention. We desire, therefore, that the appended claims be accorded the broadest interpretation consistent with their language and the prior art.

We claim as our invention:

1. A protective relaying system for responding to faults on an electric power line, comprising a first fault-responsive relay element, a second fault-responsive relay element, said two elements responding to different electrical conditions, the second element being relatively slower in its response to fault conditions, an auxiliary relay, means for causing said auxiliary relay to be energized when the first element is actuated in response to fault conditions, means for preventing said energization if the auxiliary relay remains unenergized and the second element is actuated in response to fault conditions, and holding-circuit means for supplementarily energizing said auxiliary relay when the second element is actuated if the auxiliary relay is in actuated condition at that moment.

2. A protective relaying system for responding to faults on an electric power line, comprising a first fault-responsive relay element, a second fault-responsive relay element, the first element being more responsive to the direction of the fault-current than the second element, the second element being relatively slower in its response to fault conditions, an auxiliary relay, means for causing said auxiliary relay to be energized when the first element is actuated in response to fault conditions, means for preventing said energization if the auxiliary relay remains unenergized and the second element is actuated in response to fault conditions, and holding-circuit means for supplementarily energizing said auxiliary relay when the second element is actuated if the auxiliary relay is in actuated condition at that moment.

3. The combination with an electric power line, and circuit-interrupting means therefor, of a protective relaying system for responding to faults on said power line, comprising a first fault-responsive relay element, a second fault-responsive relay element, said two elements responding to different electrical conditions, the second element being relatively slower in its response to fault conditions, an auxiliary relay, means responsive to the condition of actuation or non-actuation of said auxiliary relay for performing some control function in connection with said circuit-interrupting means, means for causing said auxiliary relay to be energized when the first element is actuated in response to fault conditions, means for preventing said energization if the auxiliary relay remains unenergized and the second element is actuated in response to fault conditions, and holding-circuit means for supplementarily energizing said auxiliary relay when the second element is actuated if the auxiliary relay is in actuated condition at that moment.

4. The combination with an electric power line, and circuit-interrupting means therefor, of a protective relaying system for responding to faults on said power line, comprising a first fault-responsive relay element, a second fault-responsive relay element, the first element being more responsive to the direction of the fault-current than the second element, the second element being relatively slower in its response to fault conditions, an auxiliary relay, means responsive to the condition of actuation or non-actuation of said auxiliary relay for performing some control function in connection with said circuit-interrupting means, means for causing said auxiliary relay to be energized when the first element is actuated in response to fault conditions, means for preventing said energization if the auxiliary relay remains unenergized and the second element is actuated in response to fault conditions, and holding-circuit means for supplementarily energizing said auxiliary relay when the second element is actuated if the auxiliary relay is in actuated condition at that moment.

5. A relaying system, comprising a first relay element, a second relay element, an auxiliary relay, means for performing a relay function in response to the auxiliary relay, means responsive to a predetermined event for causing the second relay element to be actuated, but only after an interval of time, differently responsive means for effecting the control of the first relay element, means for causing said auxiliary relay to be energized when the first element is actuated, and means responsive to the actuation of said second relay element for holding said auxiliary relay in whatever position it is in when said second relay element becomes actuated.

6. A relaying system, comprising a first relay element, a second relay element, an auxiliary relay, means for performing a relay function in response to the auxiliary relay, means responsive to a predetermined event for causing the second relay element to be actuated, but only after an interval of time, differently responsive means for effecting the control of the first relay element, means for causing said auxiliary relay to be energized when the first element is actuated, and means responsive to the actuation of said second relay element for holding said auxiliary relay in whatever position it is in when said second relay element becomes actuated, and said last-mentioned means comprising a lock-out-circuit means which is responsive to the non-actuation of the auxiliary relay and the actuation of the second element for thereafter preventing the actuation of the auxiliary relay regardless of subsequent change of position of the first element, and a holding-circuit means which is responsive to the actuation of both the auxiliary relay and the second element for thereafter maintaining the actuation of the auxiliary relay regardless of a subsequent change of position of the first element.

7. The combination with an electric power line, and circuit-interrupting means therefor, of a protective relaying system for responding to faults on said power line, comprising a fault-responsive relay element, means for storing up and holding an indication of its first response to the fault conditions irrespective of an immediate subsequent change in the response of the fault-responsive relay element, and means responsive to said indication-storing means for performing some control function in connection with said circuit-interrupting means at a time subsequent to said first response.

8. A relay system, comprising a first relay element, a second relay element, an auxiliary relay, means for performing a relay function in response to the auxiliary relay without reference to the first and second relay elements, means directly responsive to the actuation of the first relay element and the non-actuation of the second relay element to also perform the aforesaid relay function, means responsive to a predetermined event for causing the second relay element to be actuated, but only after an interval of time, differently responsive means for effecting the control of the first relay element, means for causing said auxiliary relay to be energized when the first element is actuated, and means responsive to the actuation of said second relay element for holding said auxiliary relay in whatever position it is in when said second relay element becomes actuated.

9. A relay system, comprising a first relay element, a second relay element, an auxiliary relay, means for performing a relay function in response to the auxiliary relay without reference to the first and second relay elements, means directly responsive to the actuation of the first relay element and the non-actuation of the second relay element to also perform the aforesaid relay function, means responsive to a predetermined event for causing the second relay element to be actuated, but only after an interval of time, differently responsive means for effecting the control of the first relay element, means for causing said auxiliary relay to be energized when the first element is actuated, and means responsive to the actuation of said second relay element for holding said auxiliary relay in whatever position it is in when said second relay element becomes actuated, said last-mentioned means comprising a lock-out-circuit means which is responsive to the non-actuation of the auxiliary relay and the actuation of the second element for thereafter preventing the actuation of the auxiliary relay regardless of subsequent change of position of the first element, and a holding-circuit means which is responsive to the actuation of both the auxiliary relay and the second element for thereafter maintaining the actuation of the auxiliary relay regardless of a subsequent change of position of the first element.

10. Means for avoiding errors due to the reversal of indicated power-flow in an electric power-line system while a fault is being cleared therefrom, comprising the combination, with said power line and circuit-interrupting means therefor, of a protective relaying system for responding to faults on said power line, comprising a fault-responsive directional relay element, means automatically operative at about the same time as said directional element for storing up and holding an indication of the initial response of said directional element to the fault conditions, said indication-storing means operating subsequently to return to normal position, and means responsive to said indication-storing means for performing some control function in connection with said circuit-interrupting means.

11. Means for avoiding errors due to the reversal of indicated power-flow in an electric power-line system while a fault is being cleared therefrom, comprising the combination, with said power line and circuit-interrupting means therefor, of a protective relaying system for responding to faults on said power line, comprising fault-responsive directional-relay means for giving one indication when a fault occurs in such a location that the indicated fault-current seems to flow into the relaying station from the line, said fault-responsive directional-relay means giving another indication when a fault occurs in such a location that the indicated fault-current seems to flow out of the relaying station and into the line, time-delay means responsive to the first-mentioned directional indication for momentarily rendering the second-mentioned directional indication ineffective if the directional means should reverse after first having made the first-mentioned directional indication, and means responsive to said directional means for performing some control function in connection with said circuit-interrupting means.

12. Protective relaying equipment for effecting a control of line-sectionalizing circuit-interrupter means for a transmission line-section, comprising, at each end of the line-section being protected, relaying means including a power-in directionally responsive quick-acting relaying means for responding selectively to faults accompanied by current-flow into the line, and a power-out directionally responsive quick-acting relaying means for responding selectively to faults accompanied by current-flow out of the line, a communicating channel between the two ends of the line-section being protected, a transmitter means disposed at each end of the line-section for normally continuously transmitting a signalling current through said communicating channel to the other end of the line-section, transmitter-controlling means responsive to said power-in directionally responsive quick-acting relaying means for causing its associated transmitter to cease transmitting effective signalling currents, means responsive to said power-out directionally responsive quick-acting relaying means for preventing the cessation of effective signalling-current transmission during said power-out fault conditions and for a time thereafter, a receiver disposed at each end of the line-section and associated with said communication channel, and means at each end, responsive to a failure of the receiver to receive a sufficient signalling current, and responsive also to the direction of power-current flow into the line-section being protected, for quickly energizing a control circuit for the circuit-interrupter means.

13. Protective relaying equipment for effecting a control of line-sectionalizing circuit-interrupter means for a transmission line-section, comprising, at each end of the line-section being protected, relaying means including a power-in directionally responsive quick-acting relaying means for responding selectively to faults accompanied by current-flow into the line, and a power-out directionally responsive quick-acting relaying means for responding selectively to faults accompanied by current-flow out of the line, a communicating channel between the two ends of the line-section being protected, a transmitter means disposed at each end of the line-section for normally continuously transmitting a signalling current through said communicating channel to the other end of the line-section, transmitter-controlling means responsive to said power-in directionally responsive quick-acting relaying means for causing its associated transmitter to cease transmitting effective signalling currents, means responsive to said power-out directionally responsive quick-acting relaying means for preventing the cessation of effective signalling-current transmission during said power-out fault conditions and for a time thereafter, a receiver disposed at each end of the line-section and associated with said communication channel, and means at each end, responsive to a failure of the receiver to receive a sufficient signalling current, and further responsive to the actual presence of a fault on the transmission-line, and responsive also to the direction of power-current flow into the line-section being protected, for quickly energizing a control circuit for the circuit-interrupter means.

14. Protective relaying equipment for effecting a control of line-sectionalizing circuit-interrupter means for a transmission line-section, comprising, at each end of the line-section being protected, relaying means including a directionally responsive quick-acting relaying means for responding selectively to faults, giving one indication for power-in faults and another indication for power-out faults, means for in effect retarding one of said indications if it follows immediately after the opposite indication, a communicating channel between the two ends of the line-section being protected, means responsive to said directionally responsive quick-acting relaying means for transmitting a signal through said communicating channel to the other end of the line-section, and means at each end, responsive to said signal, and responsive also to the direction of power-current flow into the line-section being protected, for quickly energizing a control circuit for the circuit-interrupter means.

15. Protective relaying equipment for effecting a control of line-sectionalizing circuit-interrupter means for a transmission line-section, comprising, at each end of the line-section being protected, relaying means including a directionally responsive quick-acting relaying means for responding selectively to faults, giving one indication for power-in faults and another indication for power-out faults, means for in effect retarding one of said indications if it follows immediately after the opposite indication, a communicating channel between the two ends of the line-section being protected, means responsive to said directionally responsive quick-acting relaying means for transmitting a signal through said communicating channel to the other end of the line-section, and means, at each end, responsive to said signal, and further responsive to the actual presence of a fault on the transmission line, and responsive also to the direction of power-current flow into the line-section being protected, for quickly energizing a control circuit for the circuit-interrupter means.

16. Protective equipment for a transmission line-section, comprising line-sectionalizing circuit-interrupter means and relaying means therefor at each end of the line-section being protected, each of said relaying means including quick relaying means directionally responsive to certain faults, means for providing an intelligence-communicating channel between the two ends of the line-section being protected, auxiliary means associated with said intelligence-communicating channel for selectively co-operating with the directionally responsive means at the two ends of the protected line-section so as to respond to conditions of internal faults somewhere between the two ends of the particular line-section being protected for actuating the circuit-interrupter means at both ends of the protected line-section, said internal-fault response being quick when the directional indications which determine the presence of such internal faults follow periods of normal transmission-line operation, and means for interposing a slight time-hesitation in said internal-fault response when the directional indications which determine the presence of such internal faults occur during the existence of a transmission-line fault-condition which did not at first give said internal-fault indication.

17. Protective equipment for a transmission line-section, comprising line-sectionalizing circuit-interrupter means and relaying means therefor at each end of the line-section being protected, each of said relaying means including quick-relaying means directionally responsive to certain faults, giving one indication for power-in faults and another indication for power-out faults and time-delay tripping-means associated with each of said fault-responsive line-frequency relaying means for actuating its associated circuit-interrupter means after a time-delay, in combination with transmitter means at each end of the line-section being protected for normally transmitting a signalling current, receiver means at each end of the line-section for receiving the signalling current transmitted from the other end, each of said receiver means having contact means for quickly short-circuiting the time-delay means at its end in response to a cessation of a sufficient received current, means quickly operative at each end of the line-section being protected, in response to a power-in fault-responsive directional indication following normal operational conditions at that end, for so affecting said transmitter signalling means at that end as to cause the receiving means at the other end to fail to receive its sufficient received current from the transmitter at the first end, and means operative only after a slight time-hesitation at each end of the line-section being protected, in response to a power-in fault-responsive directional indication following a power-out fault-responsive directional indication at that end, for so affecting said transmitter signalling means at that end as to cause the receiving means at the other end to fail to receive its sufficient received current from the transmitter at the first end.

18. Protective equipment for a transmission line-section, comprising line-sectionalizing circuit-interrupter means and relaying means therefor at each end of the line-section being protected, each of said relaying means including quick relaying means directionally responsive to certain faults, giving one indication for power-in faults and another indication for power-out faults, and means for in effect retarding a power-in fault-responsive indication if it follows immediately after a power-out fault-responsive indication, in combination with transmitter means at each end of the line-section being protected for normally transmitting a signalling current, receiver means at each end of the line-section for receiving the signalling current transmitted from its own end as well as the other end, each of said receiver means having contact means for quickly actuating its associated circuit-interrupter means in response to a cessation of a sufficient received current, and means quickly operative at each end of the line-section being protected, in response to a power-in fault-responsive indication of the relaying means at that end, for so affecting said transmitter signalling means at that end as to cause the receiving means at each end to fail to receive its sufficient received current from the transmitter in question.

19. Protective equipment for a transmission line-section, comprising line-sectionalizing circuit-interrupter means and relaying means therefor at each end of the line-section being protected, each of said relaying means including quick relaying means directionally responsive to certain faults, giving one indication for power-in faults and another indication for power-out faults, in combination with transmitter means at each end of the line-section being protected for normally transmitting a signalling current, receiver means at each end of the line-section for receiving the signalling current transmitted from its own end as well as the other end, each of said receiver means having a contact which is closed when the receiver-relay is insufficiently energized, tripping means associated with the fault-responsive relaying means at each end of the protected line-section for actuating its associated circuit-interrupter means in response to said receiver-relay contact and a predetermined power-in fault-responsive directional indication, transmitter-controlling means normally quickly operative at each end of the line-section being protected, in response to a power-in fault-responsive indication following normal operational conditions of the transmission line at that end, for so affecting said transmitter signalling means at that end as to cause the receiving means at each end to fail to receive its sufficient received current from the transmitter in question, and means for introducing a slight time-hesitation in the operation of said transmitter-controlling means in response to a power-in fault-responsive indication occurring during the existence of a fault-condition of the transmission line.

20. Protective equipment for a transmission line-section, comprising line-sectionalizing circuit-interrupter means and relaying means therefor at each end of the line-section being protected, each of said relaying means including quick-relaying means directionally responsive to certain faults, and also fault-indicating relaying means responsive to the existence of certain faults somewhere on the transmission-line, means for providing an intelligence-communicating channel between the two ends of the line-section being protected, auxiliary means associated with said intelligence-communicating channel for selectively cooperating with the directionally responsive means at the two ends of the protected line-section so as to respond to conditions of internal faults somewhere between the two ends of the particular line-section being protected for quickly actuating the circuit-interrupter means at both ends of the protected line - section, and time - hesitation means responsive to the continuance of a fault-indication for a brief time without the immediate actuation of the circuit-interrupter means associated with said time-hesitation means for thereafter introducing an impediment to the immediate quick actuation of said circuit-interrupter means.

21. Protective equipment for a transmission line-section, comprising line-sectionalizing circuit-interrupter means and relaying means therefor at each end of the line-section being protected, each of said relaying means including quick-relaying means directionally responsive to certain faults, and also fault-indicating relaying means responsive to the existence of certain faults somewhere on the transmission-line, means for providing an intelligence-communicating channel between the two ends of the line-section being protected, auxiliary means associated with said intelligence-communicating channel for selectively cooperating with the directionally responsive means at the two ends of the protected line-section so as to respond to conditions of internal faults somewhere between the two ends of the particular line-section being protected for quickly actuating the circuit-interrupter means at both ends of the protected line-section, and time-hesitation means responsive to the continuance of a fault-indication for a brief time without the indication of a power-in fault-current-flow direction in the response of the directional relaying means associated with said time-hesitation means for thereafter introducing an impediment to the immediate quick actuation of said circuit-interrupter means.

22. Protective equipment for a transmission line-section, comprising line-sectionalizing circuit-interrupter means and relaying means therefor at each end of the line-section being protected, each of said relaying means including quick-relaying means directionally responsive to certain faults, and also fault-indicating relaying means responsive to the existence of certain faults somewhere on the transmission-line, means for providing an intelligence-communicating channel between the two ends of the line-section being protected, auxiliary means associated with said intelligence-communicating channel for selectively cooperating with the directionally responsive means at the two ends of the protected line-section so as to respond to conditions of internal faults somewhere between the two ends of the particular line-section being protected for quickly actuating the circuit-interrupter means at both ends of the protected line-section, and time-hesitation means responsive to an indication of a fault without material fault-current flowing into the protected line-section at the end associated with said time-hesitation means for thereafter introducing an impediment to the immediate quick actuation of the circuit-interrupter means at that end.

23. Protective equipment for a transmission line-section, comprising line-sectionalizing circuit-interrupter means and relaying means therefor at each end of the line-section being protected, each of said relaying means including quick-relaying means directionally responsive to certain faults, and also fault-indicating relaying means responsive to the existence of certain faults somewhere on the transmission-line, means for providing an intelligence-communicating channel between the two ends of the line-section being protected, auxiliary means associated with said intelligence-communicating channel for selectively cooperating with the directionally responsive means at the two ends of the protected line-section so as to respond to conditions of internal faults somewhere between the two ends of the particular line-section being protected for quickly actuating the circuit-interrupter means at both ends of the protected line-section, and time-hesitation means responsive to an indication of a fault elsewhere than in the protected line-section for thereafter introducing an impediment to the immediate quick-actuation of said circuit-interrupter means.

24. Protective equipment for a transmission line-section, comprising line-sectionalizing circuit-interrupter means and relaying means therefor at each end of the line-section being protected, each of said relaying means including quick-relaying means directionally responsive to certain faults, and also fault-indicating relaying means responsive to the existence of certain faults somewhere on the transmission-line, a communicating channel between the two ends of the line-section being protected, a transmitter means disposed at each end of the line-section for normally continuously transmitting a signalling current through said communicating channel to the other end of the line-section, transmitter-controlling means responsive to a power-in indication of said directionally responsive quick-acting relaying means for causing its associated transmitter to cease transmitting effective signalling currents, a receiver disposed at each end of the line-section and associated with said communication channel, means at each end, responsive to a failure of the receiver to receive a sufficient signalling current, and further responsive to the actual presence of a fault on the transmission-line, and responsive also to the direction of power-current flow into the line-section being protected, for quickly energizing a control circuit for the circuit-interrupter means at that end, and time-hesitation means responsive to the continuance of a fault-indication for a brief time without the immediate actuation of the circuit-interrupter means associated with said time-hesitation means for thereafter introducing an impediment to the immediate quick cessation of effective signalling-current transmission.

25. Protective equipment for a transmission line-section, comprising line-sectionalizing circuit-interrupter means and relaying means therefor at each end of the line-section being protected, each of said relaying means including quick-relaying means directionally responsive to certain faults, and also fault-indicating relaying means responsive to the existence of certain faults somewhere on the transmission-line, a communicating channel between the two ends of the line-section being protected, a transmitter means disposed at each end of the line-section for normally continuously transmitting a signalling current through said communicating channel to the other end of the line-section, transmitter-controlling means responsive to a power-in indication of said directionally responsive quick-acting relaying means for causing its associated transmitter to cease transmitting effective signalling currents, a receiver disposed at each end of the line-section and associated with said communication channel, means at each end, responsive to a failure of the receiver to receive a sufficient signalling current, and further responsive to the actual presence of a fault on the transmission-line, and responsive also to the direction of power-current flow into the line-section being protected, for quickly energizing a control circuit for the circuit-interrupter means at that end, and time-hesitation means responsive to the continuance of a fault-indication for a brief time without the indication of a power-in fault-current-flow direction in the response of the directional relaying means associated with said time-hesitation means for thereafter introducing an impediment to the immediate quick cessation of effective signalling-current transmission.

26. Protective equipment for a transmission line-section, comprising line-sectionalizing circuit-interrupter means and relaying means therefor at each end of the line-section being protected, each of said relaying means including quick-relaying means directionally responsive to certain faults, and also fault-indicating relaying means responsive to the existence of certain faults somewhere on the transmission-line, a communicating channel between the two ends of the line-section being protected, a transmitter means disposed at each end of the line-section for normally continuously transmitting a signalling current through said communicating channel to the other end of the line-section, transmitter-controlling means responsive to a power-in indication of said directionally responsive quick-acting relaying means for causing its associated transmitter to cease transmitting effective signalling currents, a receiver disposed at each end of the line-section and associated with said communication channel, means at each end, responsive to a failure of the receiver to receive a sufficient signalling current, and further responsive to the actual presence of a fault on the transmission-line, and responsive also to the direction of power-current flow into the line-section being protected, for quickly energizing a control circuit for the circuit-interrupter means at that end, and time-hesitation means responsive to an indication of a fault without material fault-current flowing into the protected line-section at the end associated with said time-hesitation means for thereafter introducing an impediment to the immediate quick cessation of effective signalling-current transmission.

27. Protective equipment for a transmission line-section, comprising line-sectionalizing circuit-interrupter means and relaying means therefor at each end of the line-section being protected, each of said relaying means including quick-relaying means directionally responsive to certain faults, and also fault-indicating relaying means responsive to the existence of certain faults somewhere on the transmission-line, a communicating channel between the two ends of the line-section being protected, a transmitter means disposed at each end of the line-section for normally continuously transmitting a signalling current through said communicating channel to the other end of the line-section, transmitter-controlling means responsive to a power-in indication of said directionally responsive quick-acting relaying means for causing its associated transmitter to cease transmitting effective signalling currents, a receiver disposed at each end of the line-section and associated with said communication channel, means at each end, responsive to a failure of the receiver to receive a sufficient signalling current, and further responsive to the actual presence of a fault on the transmission-line, and responsive also to the direction of power-current flow into the line-section being protected, for quickly energizing a control circuit for the circuit-interrupter means at that end, and time-hesitation means responsive to an indication of a fault elsewhere than in the protected line-section for thereafter introducing an impediment to the immediate quick cessation of effective signalling-current transmission.

28. Protective equipment for a transmission line-section, comprising line-sectionalizing circuit-interrupter means and relaying means therefor at each end of the line-section being protected, each of said relaying means including quick relaying means directionally responsive to certain faults, a communicating channel between the two ends of the line-section being protected, a transmitter means disposed at each end of the line-section for normally continuously transmitting a signalling current through said communicating channel to the other end of the line-section, transmitter-controlling means responsive to a power-in indication of said directionally responsive quick-acting relaying means for causing its associated transmitter to cease transmitting effective signalling currents, receiver means at each end of the line-section for receiving the signalling current transmitted from its own end as well as the other end, means at each end, responsive to a failure of the receiver to receive a sufficient signalling current, and further responsive to the actual presence of a fault on the transmission-line, for quickly energizing a control circuit for the circuit-interrupter means at that end, and time-hesitation means responsive to the continuance of a fault-indication for a brief time without the immediate actuation of the circuit-interrupter means associated with said time-hesitation means for thereafter introducing an impediment to the immediate quick cessation of effective signalling-current transmission.

29. Protective equipment for a transmission line-section, comprising line-sectionalizing circuit-interrupter means and relaying means therefor at each end of the line-section being protected, each of said relaying means including quick relaying means directionally responsive to certain faults, a communicating channel between the two ends of the line-section being protected, a transmitter means disposed at each end of the line-section for normally continuously transmitting a signalling current through said communicating channel to the other end of the line-section, transmitter-controlling means responsive to a power-in indication of said directionally responsive quick-acting relaying means for causing its associated transmitter to cease transmitting effective signalling currents, receiver means at each end of the line-section for receiving the signalling current transmitted from its own end as well as the other end, means at each end, responsive to a failure of the receiver to receive a sufficient signalling current, and further responsive to the actual presence of a fault on the transmission-line, for quickly energizing a control circuit for the circuit-interrupter means at that end, and time-hesitation means responsive to the continuance of a fault-indication for a brief time without the indication of a power-in fault-current-flow direction in the response of the directional relaying means associated with said time-hesitation means for thereafter introducing an impediment to the immediate quick cessation of effective signalling-current transmission.

30. Protective equipment for a transmission line-section, comprising line-sectionalizing circuit-interrupter means and relaying means therefor at each end of the line-section being protected, each of said relaying means including quick-relaying means directionally responsive to certain faults, a communicating channel between the two ends of the line-section being protected, a transmitter means disposed at each end of the line-section, for normally continuously transmitting a signalling current through said communicating channel to the other end of the line-section, transmitter-controlling means responsive to a power-in indication of said directionally responsive quick-acting relaying means for causing its associated transmitter to cease transmitting effective signalling currents, receiver means at each end of the line-section for receiving the signalling current transmitted from its own end as well as the other end, means at each end, responsive to a failure of the receiver to receive a sufficient signalling current, and further responsive to the actual presence of a fault on the transmission-line, for quickly energizing a control circuit for the circuit-interrupter means at that end, and time-hesitation means responsive to an indication of a fault without material fault-current flowing into the protected line-section at the end associated with said time-hesitation means for thereafter introducing an impediment to the immediate quick cessation of effective signalling-current transmission.

31. Protective equipment for a transmission line-section, comprising line-sectionalizing circuit-interrupter means and relaying means therefor at each end of the line-section being protected, each of said relaying means including quick relaying means directionally responsive to certain faults, a communicating channel between the two ends of the line-section being protected, a transmitter means disposed at each end of the line-section for normally continuously transmitting a signalling current through said communicating channel to the other end of the line-section, transmitter-controlling means responsive to a power-in indication of said directionally responsive quick-acting relaying means for causing its associated transmitter to cease transmitting effective signalling currents, receiver means at each end of the line-section for receiving the signalling current transmitted from its own end as well as the other end, means at each end, responsive to a failure of the receiver to receive a sufficient signalling current, and further responsive to the actual presence of a fault on the transmission-line, for quickly energizing a control circuit for the circuit-interrupter means at that end, and time-hesitation means responsive to an indication of a fault elsewhere than in the protected line-section for thereafter introducing an impediment to the immediate quick cessation of effective signalling-current transmission.

32. Protective equipment for a transmission line-section, comprising line-sectionalizing circuit-interrupter means and relaying means therefor at each end of the line-section being protected, each of said relaying means including quick-relaying means directionally responsive to certain faults, and also fault-indicating relaying means responsive to the existence of certain faults somewhere on the transmission-line, means associated with said quick relaying means for quickly actuating the circuit-interrupter means at both ends of the protected line-section, and time-hesitation means responsive to the continuance of a fault-indication for a brief time without the immediate actuation of the circuit-interrupter means associated with said time-hesitation means for thereafter introducing an impediment to the immediate quick actuation of said circuit-interrupter means.

ROBERT D. EVANS.
WILLIAM A. LEWIS.